(12) United States Patent
Mak (10) Patent No.: US 7,975,918 B2
(45) Date of Patent: *Jul. 12, 2011

(54) BAGGAGE CHECK-IN USING SHORT MESSAGE SERVICE

(75) Inventor: Michael Man Ho Mak, San Francisco, CA (US)

(73) Assignee: bCode Pty Limited, Sydney, NSW (AU)

( * ) Notice: Subject to any disclaimer, the term of this patent is extended or adjusted under 35 U.S.C. 154(b) by 0 days.

This patent is subject to a terminal disclaimer.

(21) Appl. No.: 12/453,239

(22) Filed: May 4, 2009

(65) Prior Publication Data

US 2009/0277961 A1    Nov. 12, 2009

Related U.S. Application Data

(63) Continuation of application No. 11/896,745, filed on Sep. 5, 2007, now Pat. No. 7,533,811, which is a continuation of application No. 10/926,977, filed on Aug. 27, 2004, now Pat. No. 7,275,689.

(30) Foreign Application Priority Data

Sep. 5, 2003  (AU) ................................ 2003904833
Mar. 1, 2004  (AU) ................................ 2004901046

(51) Int. Cl.
 *G06K 13/24*    (2006.01)
(52) U.S. Cl. ..................... 235/384; 235/382; 235/382.5; 235/462.13; 705/5; 705/13; 340/5.2; 340/5.22; 340/5.25; 340/5.28; 455/414.3; 455/899
(58) Field of Classification Search .................. 235/384, 235/382, 382.5, 462.13; 455/899, 414.3; 705/5, 13, 6; 340/5.2, 5.22, 5.25, 5.28
See application file for complete search history.

(56) References Cited

U.S. PATENT DOCUMENTS 5,504,818 A    4/1996  Okano
(Continued)

FOREIGN PATENT DOCUMENTS

JP    09-233067    9/1997
(Continued)

OTHER PUBLICATIONS

"Aeritas tries to fill void until 3G wireless is ready; Mobile boarding pass is just one application being tested", Scott Boyer, http://www.aeritas.com/includes/press/DFWTechBiz.htm, Feb. 19, 2001.

(Continued)

*Primary Examiner* — Michael G Lee
*Assistant Examiner* — Kristy A Haupt
(74) *Attorney, Agent, or Firm* — Jones Day (57) ABSTRACT

A check-in method for airlines allows passengers to use Short Message Service (SMS) to check-in themselves and baggage. A passenger requests to check-in via SMS from practically anywhere and not limited to the airport. After receipt of the request, a confirmation message is sent back to the passenger's registered mobile phone number by SMS. The system will ask the passenger for, and receive from the passenger, the number of bags they intend to check-in for the flight. The passengers can in some embodiments drop the baggage off without any required further action. The system issues an SMS-based cryptographically secure code, such as a bar-code boarding pass to the passenger once the baggage (if any) is successfully transferred and registered to existing baggage management systems through the process above. This code, when scanned, recognized and authenticated provides identification and security clearance for the passenger to board the aircraft.

36 Claims, 5 Drawing Sheets

U.S. PATENT DOCUMENTS

| | | | |
|---|---|---|---|
| 6,158,658 A | 12/2000 | Barclay | |
| 7,004,388 B2 | 2/2006 | Kohta | |
| 7,028,906 B2 | 4/2006 | Challa et al. | |
| 7,209,903 B1 | 4/2007 | Mamdani et al. | |
| 7,275,689 B2 * | 10/2007 | Mak | 235/384 |
| 7,315,944 B2 | 1/2008 | Dutta et al. | |
| 7,533,811 B2 * | 5/2009 | Mak | 235/384 |
| 2002/0060246 A1 * | 5/2002 | Gobburu et al. | 235/462.46 |
| 2003/0036355 A1 | 2/2003 | Gundlach | |
| 2003/0066883 A1 | 4/2003 | Yu | |
| 2003/0093305 A1 | 5/2003 | Davis et al. | |
| 2003/0105954 A1 | 6/2003 | Immonen et al. | |
| 2003/0153330 A1 | 8/2003 | Naghian et al. | |
| 2003/0164400 A1 * | 9/2003 | Boyd | 235/382 |
| 2003/0171960 A1 | 9/2003 | Skinner | |
| 2004/0039635 A1 | 2/2004 | Linde et al. | |
| 2004/0066273 A1 | 4/2004 | Cortina et al. | |
| 2005/0240484 A1 | 10/2005 | Yan et al. | |
| 2006/0081704 A1 | 4/2006 | Boyd | |

FOREIGN PATENT DOCUMENTS

| | | |
|---|---|---|
| JP | 2002-157610 A | 5/2002 |
| JP | 2002-269418 A | 9/2002 |
| JP | 2003-150682 A | 5/2003 |
| JP | 2004-54673 A | 2/2004 |
| WO | 02/48926 A1 | 6/2002 |

OTHER PUBLICATIONS

"Aeritas Inc. Announces FreedomPass", http://www.mobic.com/oldnews/2001/11/aeritas_inc.htm, Nov. 12, 2001.

Office Action of Japanese Patent Application No. 2007-501056 with English Translation.

* cited by examiner

BAGGAGE CHECK-IN USING SHORT MESSAGE SERVICE

CROSS REFERENCE TO RELATED APPLICATIONS

This application is a Continuation application of U.S. patent application Ser. No. 11/896,745, filed Sep. 5, 2007 now U.S. Pat. No. 7,533,811, which was a continuation of U.S. application Ser. No. 10/926,977, filed Aug. 27, 2004, now U.S. Pat. No. 7,275,689, which claimed priority to Australian Application No. 2003904833 and Australian Application No. 2004901046. Each of these applications, in its entirety, is incorporated herein by reference.

FIELD OF INVENTION

The present invention relates to a System designed to streamline and automate the business processes involved in embarking passengers onto commercial aircrafts. Particularly, the invention relates to a system that allows passengers to use Short Message Service (SMS) to check-in baggage and provide identification to board an aircraft, completely paperlessly. Due to the mobile access nature of phones that support SMS, passengers can commence the check-in process prior to arrival at the airport, eliminating time spent queuing for and checking-in at the airline check-in counters.

The system may also use SMS to authenticate passenger and baggage identity through a transmission of codes using SMS, user passwords and integration with photo identifications. These system features are essential for the highly security-conscious air travel industry.

BACKGROUND

The passenger check-in process at the airport is one of the most costly exercises for both passengers and airlines. Passengers sometimes spend an hour or more trying to get through the queues at the check-in counter awaiting physical baggage check-in. This can sometimes cause certain passengers to be late to board the aircraft, consequently causing delays in take-offs, and more delays on the part of the aircrafts, the airline, and its passengers. Airlines are not known have not successfully moved the check-in process off-counter.

There have been many attempts at streamlining this process, from e-tickets to self-check-in kiosks, from card-swipe identifications to remote check-in via PDAs.

These attempts have however failed to address one or more of the following problems:
1. How to automate check-in for passengers with baggage to check-in;
2. How to cut down the paper-trail from ticket issue to check-in to boarding pass;
3. How to remove the bottleneck at the check-in process, or to remove part of that process altogether;
4. How to address all of the above whilst maintaining or improving on the security of the process in light of global security requirements.

OBJECTS AND SUMMARY OF SOME EMBODIMENTS OF THE INVENTION

It is an object of the present invention to cut down the time it requires for aircraft passengers to check-in themselves and optionally their baggage at the airport.

It is another object of the present invention to cut down the paper documentation required for aircraft passengers to check themselves and their baggage at the airport.

Accordingly, a system allows passengers to use Short Message Service (SMS) to check-in baggage and provide identification to board an aircraft. The system may comprise a method for receiving a request to check-in via SMS from the passenger, whilst the passenger can be anywhere and not limited to the airport. After receipt of the request, the System will authenticate the user's identity by sending a message back to the passenger's registered mobile phone number, which can only be received by that particular mobile phone. The system will ask the passenger for, and receive from the passenger, the number of bags he/she intends to check-in for the flight. The system further contemplates a mechanism or procedure to accept the designated number of pre-checked-in bags as specified by the SMS message above, no more or no less. The passengers can in some embodiments drop the baggage off without any required further action.

In some embodiments, each of the bags is given a barcode or other code that is unique to the customer. The barcode represents a numeric code that is cryptographically secure, for example a sequence of strong randomized data digitally signed values, a secure hash generation function or encrypted using personal information that is not publicly available. The barcode can either be permanent, or not, depending on the security requirement. Once these barcodes are scanned, they are then linked to the passenger, and transferred to the existing baggage handling systems.

In other embodiments, the system issues an SMS-based cryptographically secure, for example encrypted code, such as a bar-code boarding pass to the passenger once the baggage is successfully transferred and registered to existing baggage management systems through the process above. This code, when scanned, recognized and authenticated provides identification and security clearance for the passenger to board the aircraft.

An optional method requires a user to supply a pre-defined user-specific password at some point of the process above, to complete with the process above. This provides an extra layer of security for the check-in process.

A further optional method, requires airline personnel at the point of boarding to require a passenger's photo identification, and for the unique number of the photo identification to be entered into the system and to be matched to an identification number supplied at registration to use the service, before the passenger is cleared for boarding. This provides another layer of security for the boarding process.

Additional embodiments provide a bridging mechanism with existing check-in systems. The bridging mechanism is used in the event that there is a fault in the SMS-based check-in system, or if the passengers decide to change back to the existing manual check-in system.

BEST MODE AND OTHER EMBODIMENTS OF THE INVENTION

Preferred embodiments of the invention can be envisaged of having the following modules. Each module is a combination of hardware and software, as required.

Baggage Identification Module

Figure 2:
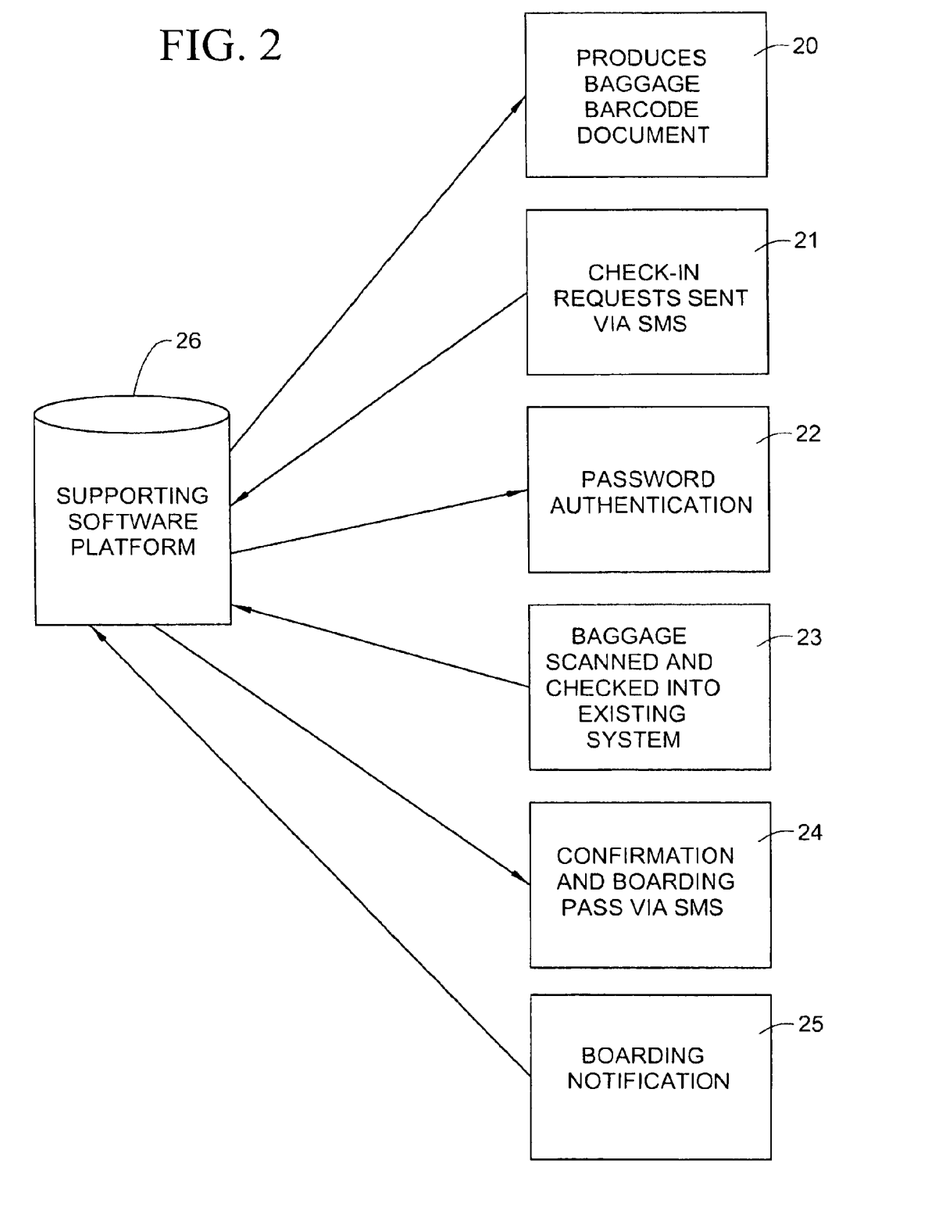
FIG. 2 is a flow chart illustrating how the SMS-based check-in process functions from the supporting software system's perspective.

As shown in FIG. 2, a baggage identification module 20 encrypts the passenger's identification information onto a paper-printed barcode or other printed code label that is to be attached to the baggage. This module can be programmed to either produce a once-off permanent identification barcode for a passenger, or regularly updated barcodes to maximize security. Where the code label is user applied, the system responds to user registration requests and generates an attachment to an email that contains usage instructions and the printable code representing a personal baggage code along with checksum code and graphical barcode that is scannable at the airport. This is preferably insertable into the container tag that is attached to the baggage.

A Passenger Identification Module

As shown in FIG. 2, a passenger identification module 21 receives an SMS message from a passenger to find out the passenger's intent to check-in and fly on the day, as well as the number of bags that he/she will be checking in to the baggage compartment of the aircraft. It utilizes the fact that only the handset registered by the passenger for the service will be able to conduct this activity, providing a level of identification and authentication for the passenger's ID. This module can in addition require a password from the passenger to prevent stolen phones from being operative. This module validates the incoming number with a list of registered users and flight information to insure that the request for check-in is legitimate. An optional password module 22 doubly authenticates the user by recognising a correct password entry by the user.

A Baggage ID Recognition Module

Figure 3:
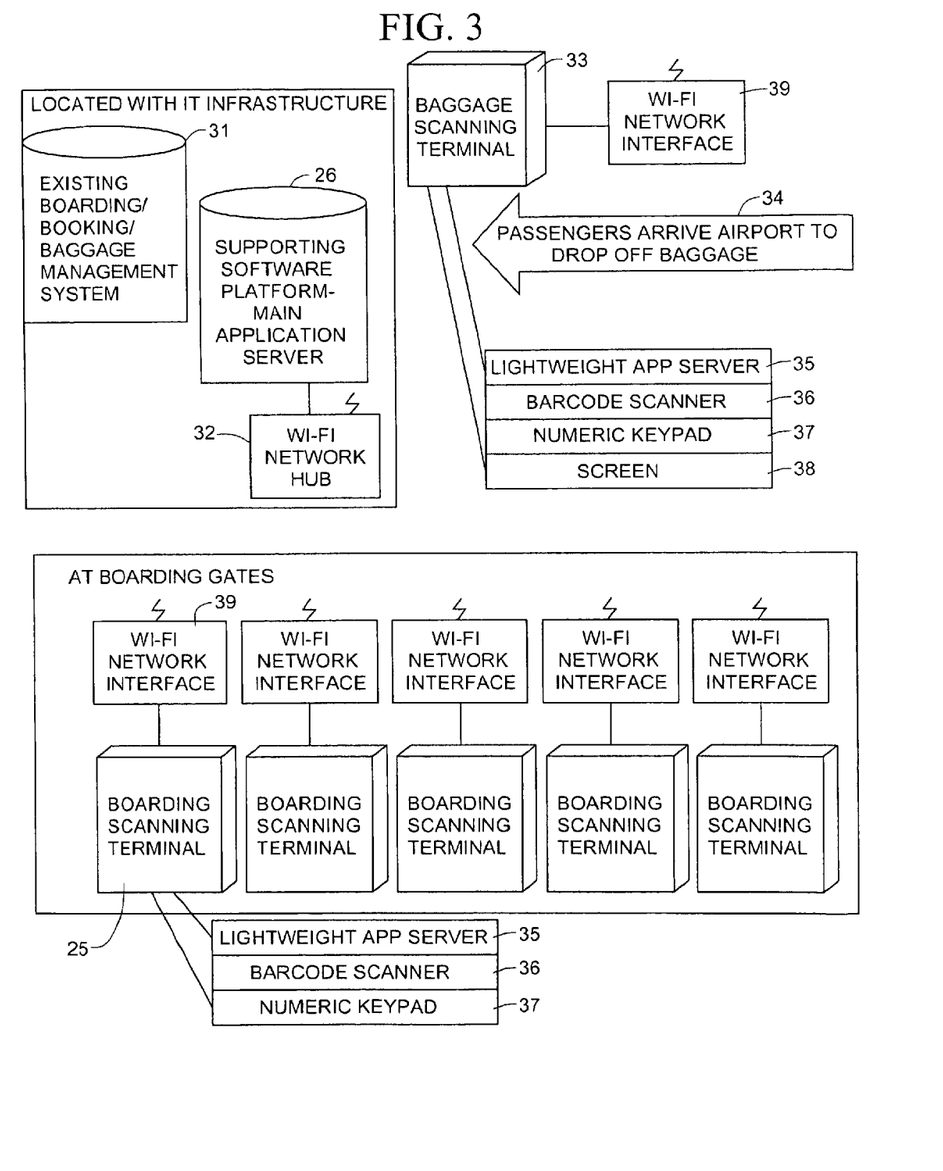
FIG. 3 is a schematic illustrating the technical architecture of certain modules and components.

As shown in FIGS. 2 and 3, a baggage ID recognition module 23 at a scanning terminal 33 scans in the barcodes or other labels, RFID tags etc. attached to the baggage arriving with a passenger 34. The module 23 checks the baggage owner's or baggage tag's ID, as well as and against the number of bags the passenger elected to check-in via module 2 above. This module will trigger a security alert if there is any inconsistency in information. The module supports a lightweight applications server 35, a barcode scanner 36, a numeric keypad 37 and a display screen 38. The module preferably communicates via a wireless network interface such as a Wi-Fi network interface 39.

SMS-Based Boarding-Pass Issue Module

As shown in FIG. 2, an SMS-based boarding-pass issue module 24 transmits a cryptographically secure (for example encrypted barcode or other SMS code to the passengers phone shortly after the baggage is scanned and validated or, immediately after the passenger's request by SMS to check-in if the passenger indicates by SMS that there is no baggage. The message transmitted to the passenger will contain a barcode or other code for boarding, as well as seating allocation information. The seating allocation information may be in plain text. This module will retrieve the necessary information from the airline's existing boarding system.

A Passenger ID Recognition Module

As shown in FIGS. 2 and 3, a passenger ID recognition module 25 at the boarding gate scans the passenger's SMS boarding-pass barcode or other phone displayed, SMS transmitted code and acknowledges that the passenger has boarded. This module will communicate the information back to the airline's existing boarding system. This module has the optional ability to request a photo ID code to be entered from the passengers photo-ID, once the aircrew has inspected the passenger's photo ID and are comfortable that the passenger is who he/she claims he/she is. The module supports a lightweight applications server, a barcode scanner 36 and a numeric keypad 37. The module preferably communicates via a wireless network interface such as a Wi-Fi network interface 39.

In preferred embodiments, the above modules 20-25 are part of an integrated system comprising an integrated software platform 26. As shown in FIG. 3, this platform 26 running on a main application server interfaces with the existing booking/boarding and baggage management system 31 as well as a wireless network hub such as a Wi-Fi network hub 32.

Figure 1:
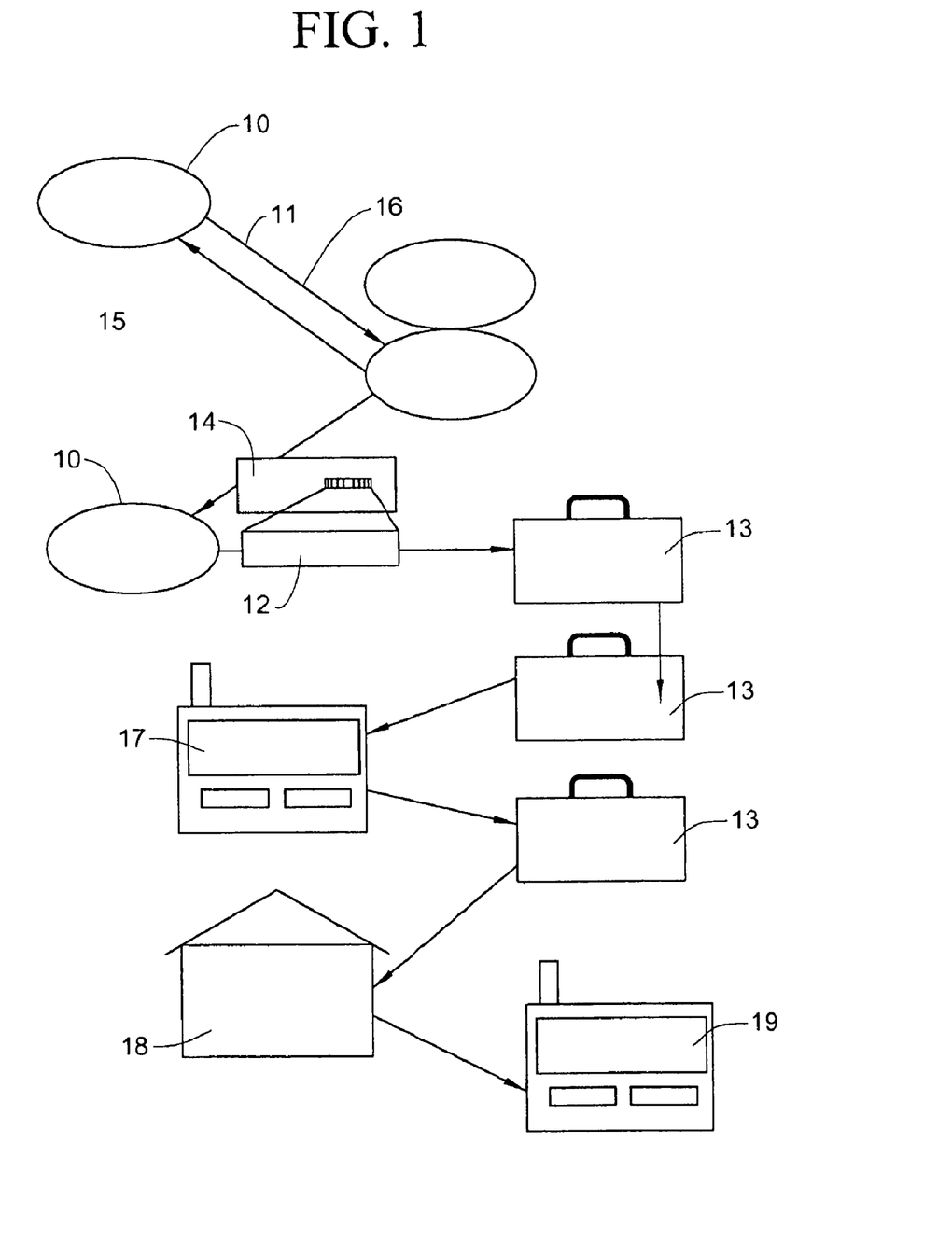
FIG. 1 is a flow chart illustrating how the SMS-based check-in process functions from the passenger's perspective.

From the passenger's point of view, the process flow will appear as follows: As shown in FIG. 1, Passengers 10 that are interested in the SMS Check-in option will have to pre-register 11 (preferably by SMS) with their identification information, model or type of mobile phone, the mobile phone number to be registered to the service. They may provide simultaneously or separately any associated password and photo-ID information. In some embodiments, the passenger registers by sending an SMS message containing their frequent flyer number. That number can be used by the airline to retrieve other relevant passenger details.

When the business rules relating to passenger identification are satisfied, the passenger is qualified to receive cryptographically secure, for example encrypted printable baggage identification codes such as barcodes or other codes 12 that are to be used by the passenger or in respect of their baggage 13. The passenger applies these baggage identification codes as labels or tags to their baggage 13 or presents them separately to check-in staff for attachment to the baggage or a handling container for the baggage. The baggage codes may be embedded into or attached to an e-ticket 14. The baggage identification codes may be essentially permanent to a passenger or replaceable for each journey.

On the day of the flight, passengers registered to the SMS check-in service may receive an SMS reminder 15 to inform them of the SMS check-in time and details.

The passenger will send an SMS request 16 to a designated phone number to initiate the check-in while on transit to the airport, or at home after they have packed their bags. They will also transmit by SMS from their phone 17, the number of bags they are checking into the baggage compartment of the aircraft. In some embodiments, a pre-determined interval is established, before which a passenger may not request check in by SMS. For security purposes, a 3-6 hour window is adequate.

Once they get to the airport, they will simply drop off the number of bags that they have elected to check into the baggage compartment of the aircraft, with the express check-in personnel of the airline 18, and simply keep walking towards boarding. The check in staff scan the passenger applied coded baggage tags (barcode, RFID, other) that were issued after registration and have been applied to the passenger's baggage prior to check-in. The number of bags is checked against the data transmitted by the passenger by SMS and stored to the system. In the alternative, a passenger may be identified by the check in staff wherein baggage tags applied (or not) according to the suitability of the passengers conventional or other identification process.

In an alternate embodiment, no check-in request is transmitted by the passenger prior to arrival at the airport if the passenger has baggage. In this alternate method, the presentation or presence of the baggage identification code on or with the baggage at the baggage check-in terminal is adequate for the airline to determine the passenger's intention to check in. With no prior notification, the check-in staff can scan the passenger's baggage identification code or codes, and determine the identity and bona fides of the passenger by reconciliation of the codes with its records. Successful reconciliation of the passenger's baggage code alone results in an automatic transmission by SMS of a bar-coded or other coded boarding pass message 19 as explained below. In this particular embodiment, a passenger with no baggage must transmit an SMS request in order to receive the bar-coded or other coded boarding pass message 19.

Where the passenger has checked-in baggage, and shortly upon successful validation, the passenger will receive the bar-coded or other coded boarding pass message 19. The passenger may travel straight to boarding, and put their mobile phone into registry with the boarding scanner, provide any photo identification if required, and board the aircraft. A digital camera may be used to capture the displayed boarding pass message for processing, decoding etc.

The passenger shows the aircrew the seating allocation displayed on the SMS transmitted message now displayed on their phone 19, and once in their seat, turns off their mobile phone and prepares for take off.

This detailed description will describe how the System addresses a number of important requirements of such a check-in system.

Baggage Identification Barcode

This is a code that is printed on paper, and may be inserted into a container tag supplied by the airline that is to be attached to the baggage. It will contain Unique numeric code from the encryption algorithm
Corresponding barcode
Code has internal checksums to prevent typographical or scanning errors
Barcode is scan-able by normal point-of-sale (POS) scanners This barcode can either be permanent, or be renewed upon each flight, or less regularly, depending on security requirement of the individual airline or country of operation. An RFID tag may be used as a data capture device instead of a bar-coded label.

Service Pre-registration

This service is only available to passengers that have pre-registered for the service. This pre-registration service needs to conclusively link the person's identification and the mobile phone, with optional passwords and photo identification and photo identification numbers. In addition this process will have to collect the model of the phone, so that the barcodes can be customized. The completion of this process will trigger unique Baggage Identification Codes to be sent to the passenger, as well as the container tag to attach the barcodes to the baggage.

Security Handling

The primary security requirement is that the airline has to conclusively link each piece of luggage to a person, and until every person linked to the luggage is aboard the aircraft, it is not taking off.

Secondly the airline will need to conclusively identify that the identity of the person boarding the aircraft is the correct person. This is done through identification through the person's mobile phone number, SMS coded boarding pass, passenger's photo identification, or a combination of these.

So the problem we have to solve here is to prevent users from checking each other's luggage in (or pretending to be another passenger) or to board the aircraft as a different person. The system will maximise security handling through one or more optional features such as:

1. E-ticket Hyperlink (The link embedded in an e-ticket email is only made available to those who have purchased an air-ticket for a particular flight)—for regularly renewed baggage barcodes.
2. User password—required to check-in remotely (supplied at registration).
3. A confirmation will only be sent to the originating MSISDN or phone number—so users need to be informed that they need to call the airline if they are receiving acknowledgements for no reasons. This means that if an intruder faked the originating MSISDN to initiate a Check-in request, they will not receive a confirmation.
4. If the intruder correctly guesses the check-in time (by sending an SMS request to check in on the appropriate day or time range etc.), they may be able to supply the number of bags by again faking the source MSISDN and reply with its own number of baggage. The System may be configured to recognize the two different persons trying to check-in to the system using the same source MSISDN (one real, one fake) and will trigger appropriate security alerts to airline personnel. These inconsistencies will manifest themselves as multiple answers to number of baggage, as well as inappropriate or duplicate answers to different steps of the registration process.
5. If an intruder is trying to fake a passenger's source MSISDN that has opted not to use express SMS check-in, the system will also trigger a security alert notifying airline personnel of the intrusion.

So in summary, with maximum security options enabled, in order to check in luggage disguised as someone else onto an aircraft, the intruder will need to:

1. Guess the existence of an appropriate flight and SMS a request to check-in within a time range corresponding to that flight;
2. Guess the passenger's identification;
3. Obtain the passenger's cryptographically secure personal baggage codes;
4. Steal the passenger's phone;
5. Obtain the passenger's unique password; and
6. Stop the passenger from attempting to checking-in.

And in order to fake the passenger's identification at boarding, the intruder will need to:

1. Stop the passenger from boarding or attempting to board;
2. Steal the passenger's phone;
3. Fake the passenger's photo-identification; and
4. Have the passenger's registered photo identification number on the faked photo identification.

Fail-Over Handling

The following methods are designed to handle faults somewhere in the entire delivery system:

1. IF FIRST CHECK-IN SMS FAILS—Passenger won't get feedback. The passenger should call the airline to rectify or use existing paper-based system. They can again be prompted by the security personnel that they should have received a reply (in the early stages of launch-like their sharp objects warning).
2. IF CHECK-IN PROCESS FAILS—User won't get final acknowledgment. Should go up to a customer service counter to rectify or use existing paper-based system. They can again be prompted by the boarding-pass personnel that they should have received something. This failure can be caused by telecommunication equipment.
3. CODE or BARCODE SCAN ERRORS—Preferred codes will have international checksums. Should there be a failure, the passenger can be sent to customer service counter to check-in using existing paper-based systems.
4. LUGGAGE TOO HEAVY—Rejected by baggage handling personnel with discretion—can notify passengers straight away before they leave the weighing stand.
5. LUGGAGE CONTAINING BANNED ITEMS—Same process as existing checking in systems.

The above description has made reference to codes transmitted by SMS to a user's mobile telephone. Barcodes have been used as an example. Barcodes can be depicted on the display such as a display of a telephone. The barcode can be used to carry and display cryptographically secure, for example encrypted data that can be scanned and decoded for use in a baggage check-in system, as discussed above. Barcodes may be scannable in one or two dimensions and are thus referred to as one or two dimensional barcodes.

The present invention presents an alternative to the barcode, particularly for use in transmission to a mobile phone, by SMS for display, scanning and decoding in the manner referred to above. The follow description pertains to a code, transmittable by SMS that can be used in lieu of a barcode in any of the situations mentioned above in which a code is transmitted, by SMS to a telephone. It will be appreciated that the same methods and codes may be used by transmitting them by other protocols other than SMS and to devices with displays other than mobile telephones. IN this context, SMS and mobile telephones are used by way of example and not limitation.

One embodiment of the invention provides a transmittable code system for encoding and decoding mobile-phone based ticket-codes using alphanumeric data. The invention uses a unique combination of alphanumeric characters that are displayed on the screen of a mobile device to communicate unique information to the handset. This is a superior substitute for traditional one-dimensional and two-dimensional mobile barcodes in many instances, as those codes are not supported by 100% of mobile handsets in the market, and will not be in the foreseeable future.

Alphanumeric coding is a unique string of characters that are essentially encoded and encrypted from the original serial code of the ticket or voucher into a unique alphanumeric string. These original serial codes are often generated from existing ticketing systems. Alphanumeric string has the best of both worlds by supporting 100% of SMS-enabled handsets, but avoids faking with a non-copyable and non-guessable unique code.

This invention provides a unique encoding and decoding algorithm that will make the system of using alphanumeric code scannable and implementable in a commercial deployment, as well as the unique system of using mobile alphanumeric coding to achieve the business objectives of mobile bar-coding in a 100% reliable and robust way. It does it by applying Optical Character Recognition (OCR) to be able to optically scan and then algorithmically decode the alphanumeric string reliably back to original serial code.

As will be explained, the present coding, display and decoding methods provide a way of sending unique code data from a business system to a mobile device using alphanumeric string text data. The methods allow alphanumeric string data displayed on mobile phones and mobile devices to be scannable optically. The methods of encoding the alphanumeric string enable data transmission that is essentially not copyable or guessable, the data being resilient in the event of scanning errors and missing graphical scan data.

Figure 4:
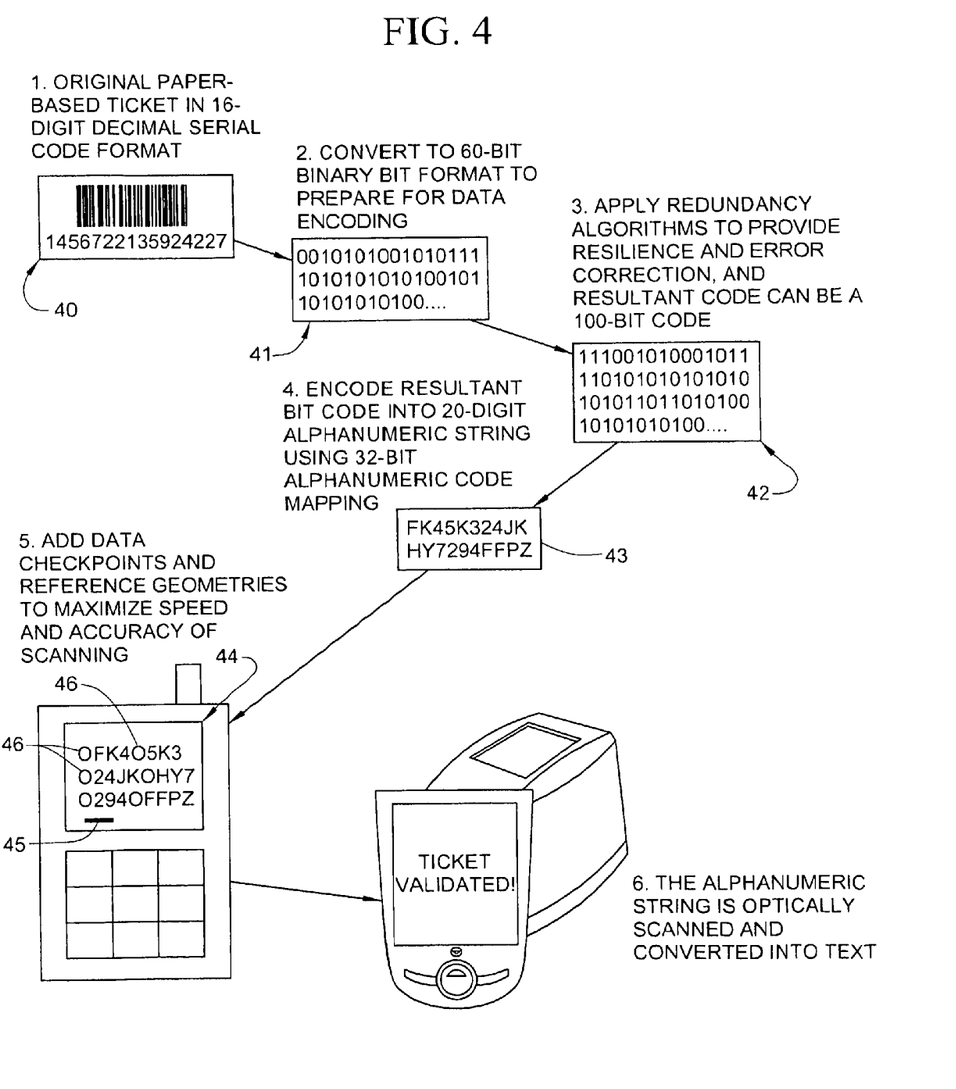
FIG. 4 is a flow chart illustrating a system for encoding and dispatching mobile-phone based codes using alphanumeric data.

As shown in FIG. 4, a software algorithm encodes a serial numeral or other numerical data or alphanumeric data or code into an alphanumeric string, which string is subsequently sent to a mobile phone using industry-standard communication protocols such as SMPP, that is subsequently scanned by an image capture device such as a digital camera, and decoded using optical character recognition algorithms, and then decoded again using the algorithm described by this invention, so that at the physical location of the transaction, the original serial code can be obtained (see FIG. 5) with a high-degree of accuracy (about 99.99% of the time) for validation for a variety of business requirements.

As shown in FIG. 4, a system encodes a serial ticket code such as a 16-digit decimal code 40, into binary bit data. Sixteen decimals will require about 60 bits of binary data. This binary bit data is then operated on with a redundancy algorithm that uses methods such as mirror bits, redundant bits and parity bits to provide resilience of data accuracy. This results in (for example) a 100 bit binary code 42. This processed bit data is then encoded into an alphanumeric string 43 using a bit-character mapping system. Thirty two bit alphanumeric code mapping of the 100 bit binary code will yield, for example a 20 digit alphanumeric code 43. This alphanumeric code 43 is then encoded again to maximize optical scannability. Data checkpoints and reference characters according to reference geometry are added to the alphanumeric code 43 to create a displayable alphanumeric code 44. This alphanumeric code 44 is optimised for display onto and scanning from a mobile telephone, wireless PDA, wireless email client etc.

More particularly and for example, a 100-bit string 42 can be encoded into a 20-character string 43 using a 5-bit-to-1-character mapping regime. While this invention does not require the mapping regime to be a 5-bit-to-1-character regime, from experimental data, a 5-bit-to-1 regime is recommended. There are 32 useful characters in this scanning regime, namely the 26 upper-case alphabets, 10 decimal digits, minus zero—that looks like an O, one—that looks like an I or an L, two—that looks like a Z, and eight, that looks like a B. Any other ambiguous alphabetical character can be replaced by its lowercase to maximize accuracy. These 32 characters are then mapped to 5-bit binary data.

Optimisation of the alphanumeric code 43 to produce an optimised displayable SMS message 44 may involve a number of different operations. One may add one or more rows of equal (=) signs 45, or another easy to recognize character in an easily scanned geometry, so that the OCR software can find the orientation of the graphical image quickly and accurately, to enable rapid scanning of the alphanumeric text data. One may also add checkpoint characters 46 in the string using easy to recognize geometries (such as X or O or space or line feed). In the event that the OCR software fails to recognize a character, and it is missed in the reported text string, rather than reporting a failed scan, these checkpoints will enable the system to know where to pad the string for missing characters so that the resultant alphanumeric string will have the same length as the original, and with a maximize number of characters in their intend positions.

It is preferred that the person operating the scanning unit knows exactly how to place the phone on the scanner for scanning (e.g., "Put your phone here, top side up, within this square").

In preferred embodiments, the system uses individually or in combination, redundancy bit-based algorithms to create ample data resiliency in the encoded word, optical scan facilitation systems, as well as an iterative scanning system as will be explained.

To reduce nefarious guessing and copying, the system of the present invention preserves of the uniqueness of the original serial code. It preferably uses randomly generated codes, and it keeps a list of these random generated codes that are valid and/or issued, so that no one can forward guess what the next batch of valid codes will be. By allowing each code to be only used once, a code cannot be forwarded or copied for another use.

The use of internal checksums and parity bits thwarts the use of illegitimate codes or combinations of characters. Redundancy, resilient and geometric regimes provide maximum accuracy.

Figure 5:
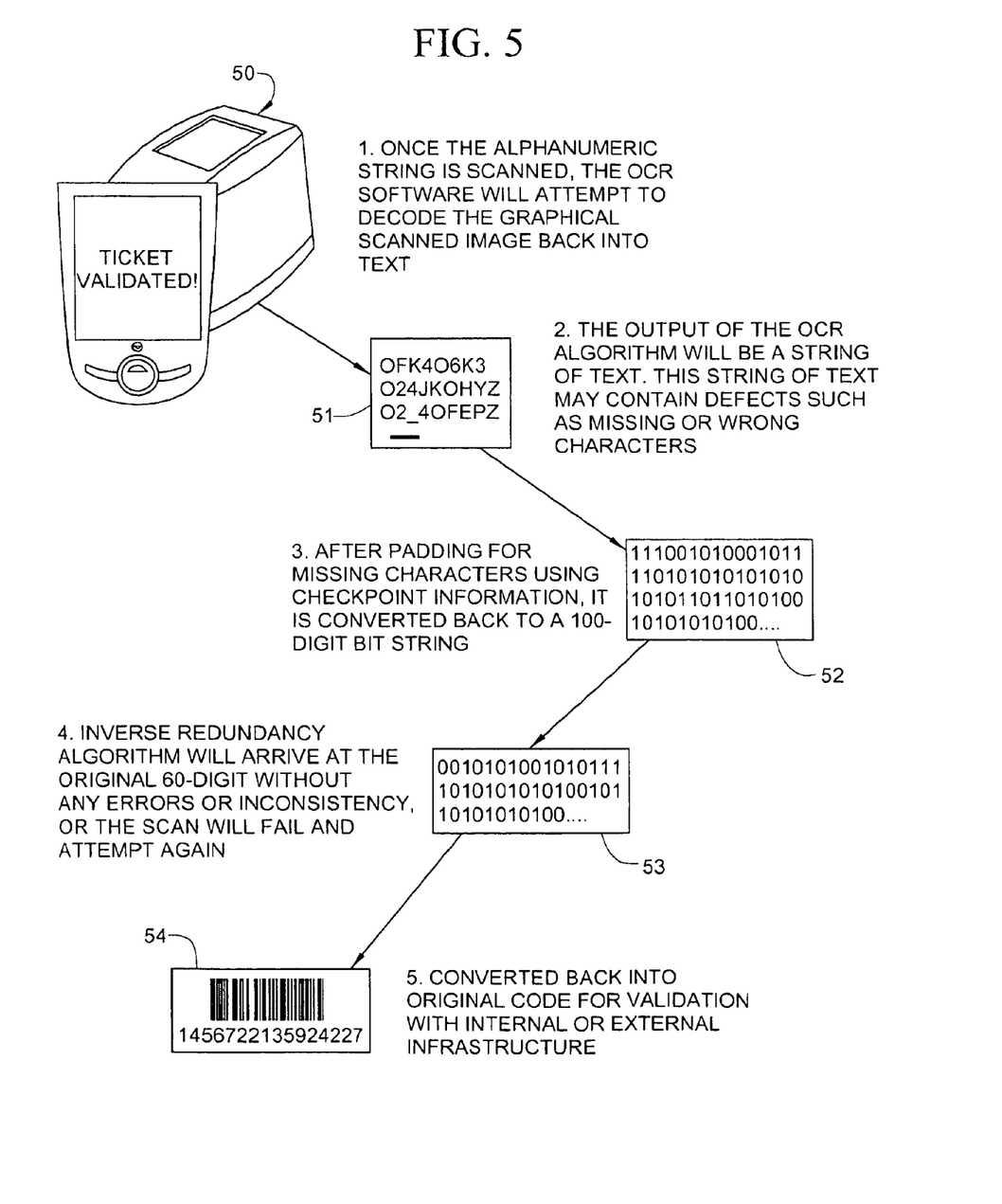
FIG. 5 is a flow chart illustrating a system for decoding mobile-phone based codes.

In some embodiments and as shown in FIG. 5, the image capture device 50 that scans the display optimised code 44 is triggered on by an image detect device, such as an infrared detector. Once turned on, the image capture device (e.g., digital camera) will take a photo of the scanned image. This can be enhanced with the activation of a flash light. Once a photo image is obtained, it will be decoded using optical character recognition algorithms. This will convert the image into text data 51. This text data is will have missing characters padded with padding characters, and have checkpoint characters removed to give the best guess at the original character string 52. This string will then be converted into a binary bit string, and have the redundancy algorithm applied to arrive at the original binary bit string 53.

Using internal checksums, the redundancy algorithm will ensure that unless it is 99.99% (for example; the accuracy threshold can be set differently) sure that the resultant binary bit string is same as the original one, the check will fail, and the scan will be forced to be done again.

This original binary string is converted back to the original serial code 54, for validation, reporting, transaction authorization or for whatever purpose the business requirement prescribes.

Due to fluctuations in lighting, positional, device-specific and optical factors, a scan may fail by not having sufficient accuracy for the redundancy algorithms to return the original binary string with the confidence level sufficient for the accuracy threshold. In this instance, the system will be forced to repeat the scanning process. This process will keep repeating itself until the scan succeeds. The person performing the scan will keep attempting to scan the same mobile device, because they will not receive any positive feedback from the system (such as an audio or video signal) until this succeeds. At some stage the user may give up on that particular code or phone, which suggests that the code is not scannable, or it is not valid.

While the invention has been described with reference to particular details, these should be interpreted as examples and not limitations to the scope or spirit of the invention as it is expressed in the claims.

What is claimed is:

1. A method of checking in an airline passenger, the method comprising:
    sending a message including an optically scannable boarding pass image to the passenger; and
    sending of coded baggage labels, tags or printed inserts to the passenger for use during baggage check-in
    wherein the passenger's boarding pass image is scannable and can be decoded to verify the passenger's identity from the decoded image; and
    wherein the boarding pass message is an encoded representation of data unique to the passenger, wherein the boarding pass message is displayable by the passenger as a boarding pass image, the image being optically scannable.

2. The method of claim 1, wherein the message is an SMS message.

3. The method of claim 1, wherein data is captured about the passenger during registration and the data comprises a telephone number to which the messages are sent.

4. The method of claim 1, wherein data captured about the passenger during registration comprises a password that is used during a later check in to verify the passenger.

5. The method of claim 4, further comprising the passenger transmitting their frequent flyer number.

6. The method of claim 1, wherein the boarding pass image is a bar code.

7. The method of claim 6, wherein the bar code is a two dimensional barcode.

8. The method of claim 1, wherein the boarding pass image is an alphanumeric code.

9. The method of claim 8, wherein the alphanumeric code displays data checkpoints or reference characters.

10. The method of claim 1, wherein transmitting of the boarding pass message to the passenger occurs upon the passenger sending a message that indicates that they have no luggage.

11. The method of claim 1, wherein transmitting of the boarding pass message to the passenger occurs upon the passenger successfully checking in their luggage.

12. The method of claim 1, wherein the boarding pass message further comprises seating allocation information that is displayable.

13. A method of checking in an airline passenger, the method comprising:
    sending a message including an optically scannable boarding pass image to the passenger;
    wherein the passenger's boarding pass image is scannable and can be decoded to verify the passenger's identity from the decoded image;
    wherein the boarding pass message is an encoded representation of data unique to the passenger, wherein the boarding pass message is displayable by the passenger as a boarding pass image, the image being optically scannable; and
    wherein transmitting of the boarding pass message to the passenger occurs upon the passenger sending a message that indicates that they have no luggage.

14. The method of claim 13, wherein the message is an SMS message.

15. The method of claim 13, wherein data is captured about the passenger during registration and the data comprises a telephone number to which the messages are sent.

16. The method of claim 13, wherein data captured about the passenger during registration comprises a password that is used during a later check in to verify the passenger.

17. The method of claim 16, further comprising the passenger transmitting their frequent flyer number.

18. The method of claim 13, further comprising sending of coded baggage labels, tags or printed inserts to the passenger for use during baggage check-in.

19. The method of claim 13, wherein the boarding pass image is a bar code.

20. The method of claim 19, wherein the bar code is a two dimensional barcode.

21. The method of claim 13, wherein the boarding pass image is an alphanumeric code.

22. The method of claim 21, wherein the alphanumeric code displays data checkpoints or reference characters.

23. The method of claim 13, wherein transmitting of the boarding pass message to the passenger occurs upon the passenger successfully checking in their luggage.

24. The method of claim 13, wherein the boarding pass message further comprises seating allocation information that is displayable.

25. A method of checking in an airline passenger, the method comprising:

sending a message including an optically scannable boarding pass image to the passenger;

wherein the passenger's boarding pass image is scannable and can be decoded to verify the passenger's identity from the decoded image;

wherein the boarding pass message is an encoded representation of data unique to the passenger, wherein the boarding pass message is displayable by the passenger as a boarding pass image, the image being optically scannable; and wherein transmitting of the boarding pass message to the passenger occurs upon the passenger successfully checking in their luggage.

26. The method of claim 25, wherein the message is an SMS message.

27. The method of claim 25, wherein data is captured about the passenger during registration and the data comprises a telephone number to which the messages are sent.

28. The method of claim 25, wherein data captured about the passenger during registration comprises a password that is used during a later check in to verify the passenger.

29. The method of claim 28, further comprising the passenger transmitting their frequent flyer number.

30. The method of claim 25, further comprising sending of coded baggage labels, tags or printed inserts to the passenger for use during baggage check-in.

31. The method of claim 25, wherein the boarding pass image is a bar code.

32. The method of claim 31, wherein the bar code is a two dimensional barcode.

33. The method of claim 25, wherein the boarding pass image is an alphanumeric code.

34. The method of claim 33, wherein the alphanumeric code displays data checkpoints or reference characters.

35. The method of claim 25, wherein transmitting of the boarding pass message to the passenger occurs upon the passenger sending a message that indicates that they have no luggage.

36. The method of claim 25, wherein the boarding pass message further comprises seating allocation information that is displayable.

\* \* \* \* \*